(12) United States Patent
Kruse et al.

(10) Patent No.: US 12,046,771 B2
(45) Date of Patent: Jul. 23, 2024

(54) METHOD FOR OPERATING A MOTOR VEHICLE IN A COLLISION SITUATION AND MOTOR VEHICLE

(71) Applicant: AUDI AG, Ingolstadt (DE)

(72) Inventors: Lars Kruse, Ingolstadt (DE); Daniel Schmid, Stammham (DE); Sascha Staudenmaier, Gaimersheim (DE); Thomas Weiss, Böhmfeld (DE)

(73) Assignee: AUDI AG, Ingolstadt (DE)

( * ) Notice: Subject to any disclaimer, the term of this patent is extended or adjusted under 35 U.S.C. 154(b) by 191 days.

(21) Appl. No.: 17/548,968

(22) Filed: Dec. 13, 2021

(65) Prior Publication Data
US 2022/0185124 A1 Jun. 16, 2022

(30) Foreign Application Priority Data
Dec. 14, 2020 (DE) .......................... 102020133255.6

(51) Int. Cl.
*H01M 50/30* (2021.01)
*H01M 50/249* (2021.01)
(Continued)

(52) U.S. Cl.
CPC ......... *H01M 50/30* (2021.01); *H01M 50/249* (2021.01); *H01M 50/367* (2021.01);
(Continued)

(58) Field of Classification Search
CPC ........ B60L 50/64; B60L 58/26; H01M 50/24; H01M 2200/20; H01M 50/249
See application file for complete search history.

(56) References Cited

U.S. PATENT DOCUMENTS

2012/0094156 A1* 4/2012 Lim .................... H01M 50/30
429/82
2017/0222288 A1* 8/2017 Ashfield ............... H01M 12/06
(Continued)

FOREIGN PATENT DOCUMENTS

CN 103959538 A 7/2014
CN 105280861 A 1/2016
(Continued)

OTHER PUBLICATIONS

German Search Report issued on Sep. 6, 2021 in corresponding German Application No. 102020133255.6; 14 pages; Machine translation attached.

(Continued)

*Primary Examiner* — Milton I Cano
*Assistant Examiner* — Albert Michael Hilton
(74) *Attorney, Agent, or Firm* — Maier & Maier, PLLC (57) ABSTRACT

A battery arrangement having a housing lower part and a housing cover arranged on the housing lower part, and at least one battery module which is arranged in the battery arrangement and which has at least one battery cell. The at least one battery module has a first side defining an upper side and is arranged in the battery arrangement in such a way that the upper side of the battery module faces toward the housing cover and is at a distance from the housing cover in at least one region of the upper side. Furthermore, between the upper side of the battery module and the housing cover, a heat-conducting compound that completely fills a space between the at least one region of the upper side and the housing cover is arranged.

19 Claims, 3 Drawing Sheets

(51) Int. Cl.
*H01M 50/367* (2021.01)
*B60L 50/64* (2019.01)
*B60L 58/26* (2019.01)
*H01M 50/24* (2021.01)

(52) U.S. Cl.
CPC ............... *B60L 50/64* (2019.02); *B60L 58/26* (2019.02); *H01M 50/24* (2021.01); *H01M 2200/20* (2013.01)

(56) References Cited

U.S. PATENT DOCUMENTS

| | | | |
|---|---|---|---|
| 2018/0316071 A1* | 11/2018 | Newman | H01M 10/613 |
| 2019/0173139 A1* | 6/2019 | Kellner | H01M 10/6556 |
| 2020/0321670 A1 | 10/2020 | Hooper et al. | |
| 2020/0411912 A1* | 12/2020 | Akens | H01M 10/4257 |

FOREIGN PATENT DOCUMENTS

| | | | |
|---|---|---|---|
| CN | 108389985 A | 8/2018 | |
| CN | 111326690 A | 6/2020 | |
| CN | 111354888 A | 6/2020 | |
| DE | 102008034873 A1 | 1/2010 | |
| DE | 102008059967 A1 | 6/2010 | |
| DE | 102017128529 A1 | 6/2019 | |
| EP | 2104121 A1 | 9/2009 | |

OTHER PUBLICATIONS

Office Action issued on Dec. 29, 2023, in corresponding Chinese Application No. 202111518048.8, 18 pages.

* cited by examiner

METHOD FOR OPERATING A MOTOR VEHICLE IN A COLLISION SITUATION AND MOTOR VEHICLE

FIELD

The invention relates to a battery arrangement having a battery housing having a housing lower part and a housing cover arranged on the housing lower part. Furthermore, the battery arrangement has at least one battery module arranged in the battery housing, which comprises at least one battery cell, wherein the at least one battery module has a first side defining an upper side and is arranged in the battery housing in such a way that the upper side of the battery module faces toward the housing cover and is at a distance from the housing cover in at least one region of the upper side. The invention furthermore also relates to a method for providing a battery arrangement.

BACKGROUND

Present battery systems, in particular high-voltage batteries for electric or hybrid vehicles, usually only have one-sided cooling, which is installed from the lower side of the battery system. Two-sided or multi-sided cooling to improve the cooling performance can often only be implemented to a limited extent, in particular with regard to efficiency. This is due to dimensional chains and tolerances, which do not allow an efficient and exact connection of the modules to the cooling device, for example a cooling plate.

For example, DE 10 2008 059 967 A1 describes a battery having a heat-conducting plate arranged in the battery housing, wherein the heat-conducting plate is fastened to the individual cells of the battery on the upper side or lower side. The individual cells are preferably arranged having the pole side toward the heat-conducting plate and the heat-conducting plate has recesses, wherein the pole contacts of the individual cells protrude through the recesses. Cell connectors can then be fastened to the pole contacts that are led through the heat-conducting plate.

Furthermore, DE 10 2008 034 873 A1 describes a battery having multiple individual cells, in particular round cells, and a heat sink having recesses, in each of which an individual cell is arranged in the longitudinal extension.

Furthermore, EP 2 104 121 A1 describes a battery having multiple battery modules arranged in a battery housing, wherein such a battery module in turn has a module housing, the upper part of which is thermally connected to a housing cover via two elastic material strips extending in parallel to one another.

In all of these variants, there are inevitably spaces or air inclusions of different sizes between the battery cells and the relevant heat sinks or cooling devices, either due to the geometry of the design or due to manufacturing-induced tolerances. Such influences reduce the efficiency of the cooling.

SUMMARY

The object of the present invention is therefore to provide a battery arrangement and a method which enable a battery cell or a battery module to be connected to a cooling device as efficiently as possible.

A battery arrangement according to the invention has a battery housing having a housing lower part and a housing cover arranged on the housing lower part. Furthermore, the battery arrangement comprises at least one battery module arranged in the battery housing, which has at least one battery cell, wherein the at least one battery module has a first side defining an upper side and is arranged in the battery housing in such a way that the upper side of the battery module faces toward the housing cover and has a distance to the housing cover in at least one region of the upper side. Furthermore, between the upper side of the battery module and the housing cover, a heat-conducting compound that completely fills a space between the at least one region of the upper side and the housing cover is arranged, wherein the battery arrangement has at least one sealing element which at least partially seals the space.

The invention is based on the finding that by filling spaces between the upper side of a battery module and a housing cover with a heat-conducting compound for example, a potting compound having good heat conductivity, a particularly efficient thermal connection of the module upper side to the housing cover can be achieved. Not only can a good thermal connection be implemented, however, the heat-conducting compound can also be used above all to compensate for strong tolerance-related height differences in different regions of the cell upper side or also different upper sides of the respective battery cells. This in turn enables the housing cover to be designed as a cooling cover. In the simplest form, this can be provided in that the housing cover is made of metallic material and, for example, cooling air flows against the outside in order to transport the heat away from the battery. The housing cover can also be connected to a cooling device or can itself be designed as such a cooling device, for example having cooling channels, as will be explained in more detail later. The particularly great advantage of the invention, however, is that the provision of the heat-conducting compound in particular in combination with the sealing element enables the module upper side to be connected to the housing cover over the largest possible area to provide such a cooling function. The heat-conducting compound can, for example, be injected into the space in the form of a liquid or viscous compound in the course of a method for providing such a battery arrangement, wherein the sealing element ensures that this heat-conducting compound cannot flow out of this space in the liquid or viscous state. The heat-conducting compound can then cure or be cured. Any kind of gaps or air inclusions between the upper side of the module and the housing cover can thus be eliminated. This therefore allows a particularly efficient implementation of cover cooling for cooling the at least one battery module or the battery cell enclosed by it.

The battery arrangement can, for example, provide a high-voltage battery, for example for an electric or hybrid vehicle. The battery arrangement can also have multiple battery modules. The at least one battery module preferably comprises more than just one battery cell, that is to say multiple battery cells. For example, such a battery module can be provided by a cell group or a cell pack. Such a cell pack can additionally have a module housing which, for example, can be designed to be open at the top and/or bottom and which can, for example, have the form of a bracing surrounding the module. In other words, such a module housing can only have a support structure for supporting or holding together the battery cells of the battery module. However, it can also be provided that a module is only defined as a cell group that does not have a separate support structure or a separate housing. The upper side of the battery module can correspondingly be provided by the respective upper sides of the battery cells enclosed by this battery module and/or an insulation layer arranged at least in regions from its upper side, as will also be described in more detail later. In the present case, the term upper side preferably relates to the intended installation position of the battery arrangement in a motor vehicle.

The battery module can furthermore have, for example, a second side which is opposite to the first side and which accordingly defines a lower side of the battery module. Furthermore, the battery module can also have a third and a fourth side, which represent, for example, a front side and a rear side of the battery module, which delimit the battery module in its longitudinal extension direction. Furthermore, the battery module can also have a fifth and a sixth side which are also opposite to one another and which delimit the battery module in its width, for example.

The individual battery cells or, in general, the at least one battery cell can represent a lithium-ion cell, for example. As described, the heat-conducting compound can represent a compound that can be poured into the space in a liquid or viscous state and then cures. The heat-conducting compound preferably has a thermal conductivity that is higher than the thermal conductivity of air under normal conditions. The heat-conducting compound can be provided, for example, in the form of a sealing compound or as a type of plasticine.

The fact that the sealing element is designed in such a way that it at least partially seals the space is to be understood to mean that this sealing element fulfills a sealing function at least in relation to the heat-conducting compound. A sealing function does not necessarily also have to be provided with respect to other fluids, for example air or other gases. The sealing element is therefore to be designed in such a way that it can prevent the heat-conducting compound from leaking out of this space when it is poured into the space.

According to an advantageous embodiment of the invention, the sealing element, which is designed in particular as a sealing lip, is arranged on an edge region surrounding the upper side of the battery module, which delimits the upper side of the battery module in its length and width. The battery module can, for example, have a cuboid geometry. The upper side is correspondingly rectangular. The sealing element can then be designed accordingly as a circumferential edge of this rectangle, which protrudes, for example, in the direction of the housing cover from the upper side of the battery module. The sealing element contacts the housing cover on the lower side. The sealing element thus represents a connection surrounding the upper side of the battery module between this upper side and the housing cover of the battery housing. The entire space between the entire upper side of the battery module around the housing cover may thus advantageously be sealed. Accordingly, it is possible to fill this entire space with the heat-conducting compound, in particular except for a degassing region which will be explained in more detail below. The efficiency of the thermal connection to the housing cover can thus be maximized.

In addition, the battery housing preferably represents an overall battery housing for the above-mentioned HV battery. Correspondingly, multiple such battery modules can be arranged in this battery housing. The housing cover represents a housing cover that is used jointly for all battery modules. Alternatively, however, it is also conceivable that the battery housing is a module housing. In other words, only a single battery module, for example in the form of a cell group, is arranged in this battery housing having the housing cover. In other words, specially provided respective housing covers can be provided for respective battery modules of a high-voltage battery and corresponding respective spaces between these housing covers and the relevant upper sides of the respective battery modules can be filled with the heat-conducting compound. Correspondingly, multiple such battery arrangements can then be arranged in a common housing to form the high-voltage battery.

In a further particularly advantageous embodiment of the invention, the battery arrangement has a degassing region which is not filled with the heat-conducting compound and is spatially separated from the space, adjoins a degassing device of the at least one battery cell, and is designed in such a way that a gas escaping from the degassing device of the battery cell can be led at least out of the region between the upper side of the battery module and the housing cover and in particular breaking through the sealing element. The at least one battery cell thus has a degassing device, which is designed, for example, as a bursting membrane or valve or the like in the cell housing. Through such a degassing opening or such a degassing device, gases can be discharged from the battery cell and thereby an overpressure in the battery cell and an explosion of the battery cell thus caused can be prevented. In order to enable such a discharge of these gases even when the space between the upper side of the battery module and the housing cover is filled using the heat-conducting compound, such a degassing region is now advantageously provided, which is kept free from the heat-conducting compound. This degassing region thus represents a channel, which is kept free, of such a degassing device of the at least one battery cell to an exterior of the battery module. This embodiment is particularly advantageous in particular when the battery cells represent prismatic battery cells, since prismatic battery cells typically have a degassing device which is arranged on the upper side of the relevant battery cell. Thus, the thermal connection of the upper sides of such battery cells over the largest possible area to a housing cover can be made possible and nonetheless a degassing region can advantageously be kept free, which allows the escape of any possible gases arising in the battery cells. This degassing region does not necessarily have to be able to be led out in a manner breaking through the sealing element, but can be formed, for example, directly upwards to the housing cover and through an opening in the housing cover itself, which in turn can in particular be designed to be closable. However, it is particularly advantageous if this degassing region leads to the sealing element. This is because such a degassing region can then be arranged overlapping multiple degassing devices of the respective battery cells at the same time. The space required for providing such a degassing region can be significantly reduced as a result. Accordingly, there is more space available that can be filled using the heat-conducting compound in order to increase the cooling efficiency.

Accordingly, it represents a further particularly advantageous embodiment of the invention if the degassing region is designed as a degassing channel which extends over an upper side of the battery module in a longitudinal extension direction of the battery module up to a region of the sealing element. The degassing region furthermore preferably represents a region which directly adjoins the upper sides of the relevant battery cells or in general the upper side of the at least one battery cell and does not have to extend completely up to the housing cover in a direction from this upper side to the housing cover. Such a degassing channel can be provided, for example, by initially placing a type of, for example, tunnel-shaped overlay, extending in the longitudinal extension direction of the battery module, on the upper sides of the respective battery cells when the battery arrangement is provided, before the heat-conducting compound is poured in, so that the respective degassing devices of the battery cells are placed below this overlay, but at a distance from this overlay. If the housing cover is then put on and the heat-conducting compound is injected, the area under this overlay is thus kept free of the heat-conducting compound. As described, this degassing channel can lead up to the sealing element or a region of this sealing element. The sealing element can be designed in such a way that it is automatically broken through by the gas escaping from the battery cells when the gas pressure is correspondingly high, for example if it exceeds a certain limiting value. The sealing lip, which the sealing element provides, can be formed, for example, using a correspondingly elastic material, for example a rubber-like material, or from silicone or the like. Furthermore, the sealing lip can be designed in such a way that it bends outward under a corresponding gas pressure and thereby clears the path for the escaping gas.

In a further advantageous embodiment of the invention, the at least one battery module has multiple battery cells which are arranged adjacent to one another in the longitudinal extension direction, wherein the degassing channel is arranged overlapping respective degassing devices of the battery cells. In other words, the respective degassing devices of the relevant battery cells open into a single common degassing channel. This embodiment is particularly efficient, since therefore only a single degassing channel has to be provided per battery module, whereby installation space can be saved. The respective degassing devices of the battery cells preferably lie on a line, in particular an imaginary line, extending in a straight line in the longitudinal extension direction. This enables a particularly space-efficient, simple and, in particular, linear design of the degassing channel.

In a further very advantageous embodiment of the invention, at least one closable or closed filling opening, and in particular additionally a closable or closed ventilation opening, is arranged in the housing cover above the space in relation to a first direction from the upper side to the housing cover. The heat-conducting compound can be poured in or injected via such a filling opening when the battery arrangement is provided. Injection via a filling opening in the housing cover is particularly advantageous, since this allows the heat-conducting compound to be distributed as uniformly as possible over the upper side of the entire battery module. Accordingly, it is preferred that such a filling opening is arranged centrally at least in relation to one direction, in particular perpendicular to the longitudinal extension direction. Since the space into which the heat-conducting compound is poured is laterally sealed by the sealing element and is thus delimited, lateral provision of such filling openings is less preferred, since this would impair the sealing function under certain circumstances or would result in more complex sealing measures, since then when pulling out an injection device from this opening after the thermal conductive compound has been poured in, it has to be prevented from flowing out of this opening. A filling opening in the housing cover prevents it from flowing out through this opening due to gravity and no further sealing measures are required. Nevertheless, it is nonetheless possible to close this filling opening after the heat-conducting compound has been poured in, for example by way of a suitable closure, for example a plug or the like. This filling opening can, however, also be designed to be self-closing, namely in that it is automatically closed by the escaping filler compound that cures. Furthermore, a ventilation opening is also provided in the housing cover. As a result, while the heat-conducting compound is being poured into the space, the air displaced in the process can escape from this space through the ventilation opening. This can be closed after pouring in the heat-conducting compound in the same way as described for the filling opening, namely by a separate cover or closure provided for the ventilation opening or by the filler compound, i.e., the heat-conducting compound, that partially escapes from this opening when the space is completely filled. The automatic closing by the escaping heat-conducting compound is particularly advantageous since no additional closing measures have to be provided here.

Furthermore, it is particularly advantageous if the at least one filling opening is arranged above the degassing channel in relation to the first direction. Since the degassing channel preferably runs centrally in the longitudinal extension direction with respect to the width of the battery module, a filling opening above this degassing channel allows uniform filling of the heat-conducting compound. At the same time, this avoids a lateral force on the degassing channel, for example an insert covering it, which could result in a displacement of such an insert if it is not fastened. By pouring in the heat-conducting compound above this degassing channel and thus above such an insert, there is no need to fear such displacement of the insert. In addition, the number of necessary filler openings can be reduced to a minimum, in particular to one, in order to ensure an even distribution of the heat-conducting compound.

In a further advantageous embodiment of the invention, the at least one battery cell has a first side on which cell pole connections of the at least one battery cell, and in particular the degassing device, are arranged, wherein the at least one battery cell is arranged in the battery housing in such a way that the first side of the at least one battery cell faces toward the housing cover. This is particularly advantageous when the battery cell is a prismatic cell. These are typically arranged in the battery housing in such a way that their cell pole connections are oriented upwards. It is now advantageously possible due to the invention, in spite of the surface regions of the upper sides of such battery cells at different heights due to tolerances and design, on which the cell pole connections of the respective battery cells and also the degassing device are arranged, to nonetheless thermally connect the respective upper sides of the battery cells well to the housing cover at least in regions, so that efficient cover cooling can be provided. At the same time, the above-described degassing channel also prevents the upper side-side degassing devices of the battery cells from being closed by the heat-conducting compound. Degassing is nonetheless ensured. The invention and its embodiments thus have particularly great advantages upon the use of prismatic battery cells. Nevertheless, the invention and its embodiments can also be implemented very similarly using pouch cells. However, these typically do not have their cell pole connections on the upper side, but in a lateral region between upper side and lower side. Furthermore, pouch cells often have a circumferential folded seam that extends, for example, over the upper side, but also over the lateral regions and the lower side. The possibility of degassing the pouch cells is typically also provided via such a folded seam. A degassing channel extending on the upper side is therefore not necessarily required; such a degassing channel could also be provided in a lateral region of this battery cell and thus not between the upper side of a respective battery cell and the housing cover. This makes the thermal connection of such a pouch cell to a housing cover even simpler, since, for example, the entire space between the entire upper side of such a pouch cell and the housing cover can thus be filled using the heat-conducting compound. Electrical insulation on the upper side, as will be explained in more detail below, can, however, also be provided on the upper side in the same way in the case of pouch cells, even if the cell poles are not located at this point.

In a further advantageous embodiment of the invention, the degassing channel extends over a first region of the first side of the at least one battery cell and the battery arrangement has at least one electrically insulating insulation layer which, in at least one second region of the first side of the battery cell different from the first region, is arranged overlapping at least the cell pole connections, in particular wherein the degassing device is arranged in relation to a second direction between the two cell pole connections of the battery cell, wherein the first side of the battery cell is divided into two second regions and the central first region arranged between the two second regions, via which the degassing channel extends, wherein an electrically insulating insulation layer is arranged in each case in one of the second regions at least overlapping the respective cell pole connection. The level of safety can advantageously be increased by such an insulation layer. In particular, such an insulation layer in combination with the degassing channel makes it possible to provide complete electrical insulation between the upper side of the respective battery cells and the heat-conducting compound. In addition, such an insulation layer can also serve as protection against touch. The degassing channel or its wall is also preferably formed from an electrically insulating material, for example a plastic. Regions of the upper sides of the battery cells that are not overlapped by the degassing channel are correspondingly insulated from the heat-conducting compound by the insulation layer described. Since the degassing channel preferably extends centrally in relation to the width direction in the longitudinal extension direction of the battery module, two insulation layers in the form of two electrically insulating strips are preferably provided on the upper sides of the battery cells on the left and right in the longitudinal extension direction of the battery module. If the cell pole connections and the degassing device are designed differently with respect to their arrangement on the respective upper sides of the battery cells, however, it is also conceivable that, for example, the degassing channel extends in an edge region of the upper side of the battery cells and the remaining region of the upper side is covered by a one-piece insulation layer.

Such an insulation layer can be provided, for example, in the form of a mica plate or a so-called mica sheet or in the form of an insulating tape, that is to say a flexible insulating tape, in particular adhesive tape, or as a plastic plate or plastic film or the like. A flexible, deformable design of this insulation layer is particularly advantageous because it can thus cling particularly well to the surface geometry of the upper sides of the battery cells that are to be covered by this layer. This in turn requires the heat transfer from the upper sides of the battery cells via the heat-conducting compound to the housing cover since this allows air gaps and air inclusions to be minimized or completely eliminated.

The cell pole connections are also interconnected, for example via cell connectors or busbars or the like. This electrical interconnection is then also covered by this insulation layer, at least if it is not located under the degassing channel. Any electrical or electronic components which may be present and which are arranged in the area of the module upper side can also be covered by this insulation layer. Comprehensive electrical protection is thus provided and nonetheless a particularly efficient thermal connection between the upper side of the battery cells and the housing cover is made possible.

As already indicated at the outset, it is particularly advantageous if the housing cover, as is provided according to a further advantageous embodiment of the invention, is designed as a cooling device and has cooling channels through which a coolant can flow. This makes it possible to provide particularly efficient cooling, in particular active, in particular actively controllable, cooling. Any desired cooling medium can be used to flow through the cooling channels, for example a water-glycol mixture.

Furthermore, the battery arrangement can also have a cooling device on the lower side. For example, the battery housing can comprise a battery base which is arranged opposite to the housing cover and on which the at least one battery module is arranged with its lower side. The lower side of the battery module is arranged opposite to the upper side here. Furthermore, the lower side of the at least one battery module can also be connected to this battery housing base via a heat-conducting compound. The battery housing base can also comprise cooling channels through which a cooling medium can flow, in order to provide cooling that is as efficient as possible. The housing base is thus designed as a cooling base. The housing base can alternatively also be designed solely as a plate or thin sheet metal, which in turn is arranged on a cooling device, for example a plate having integrated cooling channels. The connection of a battery module on the lower side to such a cooling base is generally simpler because the respective lower sides of the battery cells, which are comprised by the at least one battery module, can initially be aligned with one another, so that the distances between the lower sides of the battery cells and the cooling base vary significantly less strongly than, for example, the distances between the upper sides of the respective battery cells and the housing cover. In order to introduce the heat-conducting compound between the cooling base and the at least one battery module, either the heat-conducting compound can first be applied to the upper side of the cooling base and then the battery module can be placed and pressed onto the heat-conducting compound in the housing, or vice versa the battery module can also first be arranged and fastened in the battery housing and then the heat-conducting compound can be initiated, for example through filling openings arranged in the cooling base or laterally arranged filling openings, in the gap between the lower sides of the battery cell and the cooling base.

Especially when both the battery housing base and also the housing cover are designed as cooling devices, particularly efficient cooling of the battery modules and the battery cells contained therein can be provided.

Furthermore, the invention also relates to a method for providing a battery arrangement, wherein a housing lower part is provided in which at least one battery module is arranged, which has at least one battery cell, wherein the at least one battery module has a first side defining an upper side. Furthermore, a housing cover is provided and the housing cover is arranged on the housing lower part in such a way that the upper side of the battery module faces toward the housing cover, wherein the upper side is at a distance from the housing cover in at least one region of the upper side. Furthermore, a heat-conducting compound is introduced between the upper side of the battery module and the housing cover, this compound completely filling up a space between the at least one region of the upper side and the housing cover, wherein the battery arrangement has at least one sealing element which at least partially seals the space.

Accordingly, the advantages mentioned for the battery arrangement according to the invention and its designs also apply in the same way here to the method according to the invention. In addition, the objective features mentioned in conjunction with the battery arrangement according to the invention and its designs enable the method according to the invention to be refined by further corresponding method steps.

Furthermore, a motor vehicle having a battery arrangement according to the invention or one of its designs are also to be considered part of the invention. The motor vehicle can be designed, for example, as an electric vehicle or a hybrid vehicle.

The motor vehicle according to the invention is preferably designed as an automobile, in particular as a passenger car or truck, or as a passenger bus or motorcycle.

The invention also comprises combinations of the features of the described embodiments. The invention therefore also includes implementations which each have a combination of the features of several of the described embodiments unless the embodiments have been described as mutually exclusive.

BRIEF DESCRIPTION OF THE FIGURES

Exemplary embodiments of the invention are described hereinafter. In the figures.

The exemplary embodiments explained hereinafter are preferred embodiments of the invention. In the exemplary embodiments, the described components of the embodiments each represent individual features of the invention to be considered independently of one another, which each also refine the invention independently of one another. Therefore, the disclosure is intended to include combinations of the features of the embodiments other than those shown. Furthermore, the described embodiments can also be supplemented by further ones of the above-described features of the invention.

In the figures, the same reference signs designate elements that have the same function.

DETAILED DESCRIPTION

Figures 1, 2:
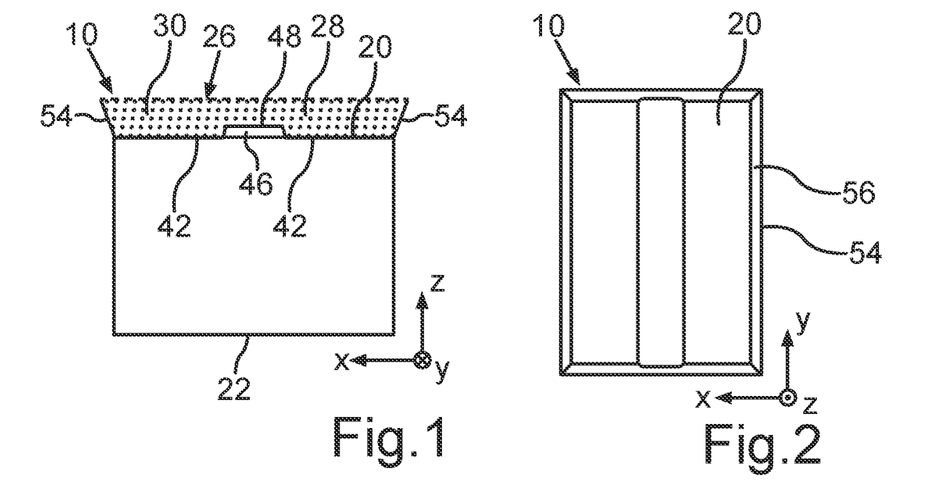
FIG. 1 shows a schematic side view of a battery module for a battery arrangement according to an exemplary embodiment of the invention.
FIG. 2 shows a schematic top view of the battery module from FIG. 1 according to an exemplary embodiment of the invention.
Figure 3:
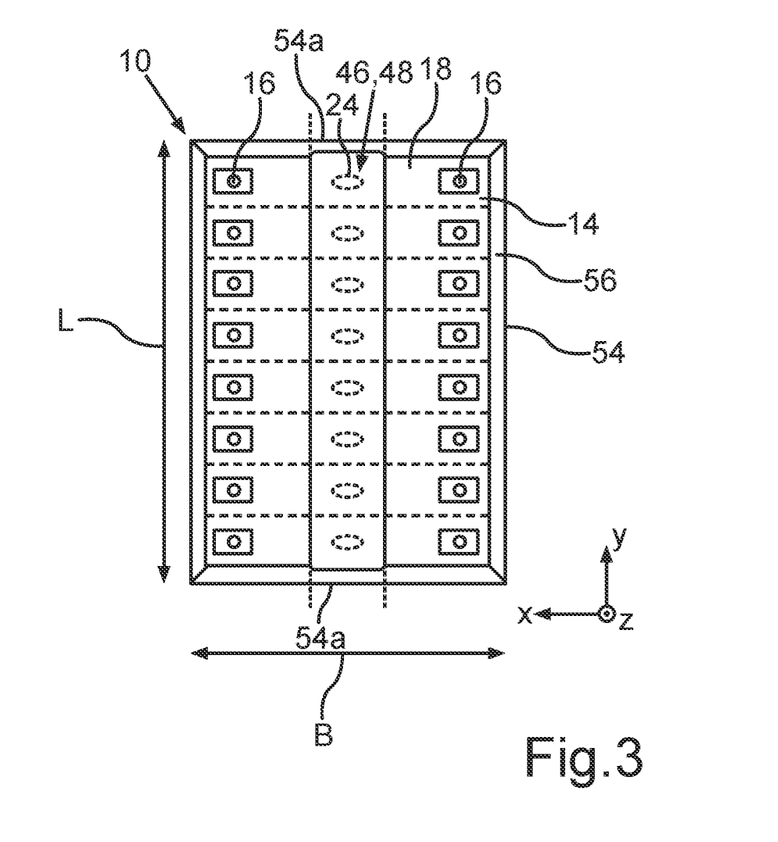
FIG. 3 shows a schematic top view of the battery module for a battery arrangement having multiple battery cells comprised by the battery module according to an exemplary embodiment of the invention.

FIG. 1 shows a schematic side view of a battery module 10 for a battery arrangement 12 (cf. FIG. 4, FIG. 5, and FIG. 6) according to an exemplary embodiment of the invention. Furthermore, FIG. 2 shows a schematic top view of this battery module shown schematically in FIG. 1. A further top view is shown in FIG. 3, wherein the individual battery cells 14 of the battery module 10 are additionally shown in FIG. 3, of which only one is provided with a reference numeral for reasons of clarity. In principle, the battery module 10 has at least one such battery cell 14, but preferably several, which are arranged adjacent to one another in a longitudinal extension direction that corresponds to the y direction shown here. In this example, prismatic battery cells 14 are shown, but the invention can also be used in the same way for pouch cells as battery cells 14.

The individual battery cells 14 also have respective cell pole connections 16, in particular two pole connections 16 per battery cell 14, one of which is formed as a positive pole and one as a negative pole. Furthermore, these cell pole connections are arranged on an upper side 18 of a respective battery cell 14. The term upper side relates here to the intended installation position in a motor vehicle, as shown, for example, in FIG. 1. An upper side 20 of the battery module is correspondingly also defined, as is shown, for example, in FIG. 1 and FIG. 2. A lower side 22 of the battery module is arranged opposite to this upper side 20. The individual cell pole connections 16 of the respective battery cells 14 are interconnected, wherein this interconnection is not explicitly shown here. In addition, the battery cells have degassing devices 24, which are arranged on the upper side 18 of the respective battery cell 14 between the two cell pole connections 16, in particular in the middle between these cell pole connections 16. These degassing devices 24 can be designed, for example, as bursting membranes, valves, or the like. These degassing devices 24 allow gases to escape from the respective battery cells 14, for example in case of the battery cells 14 overheating, in order to prevent these battery cells 14 from exploding.

In order to cool such a battery module 10 as efficiently as possible, it is now advantageously provided that the upper side 20 of such a battery module 10 is connected to a cooling device which is provided by a housing cover 26. This housing cover 26 is also indicated schematically in FIG. 1 by a dashed line. As can also be seen in FIG. 1, such a housing cover 26 is usually at a distance from the upper side 20 of the battery module 10. This creates a space 28 between the housing cover 26 and the upper side 20 of the battery module, which is now advantageously filled with a potting compound, in particular a heat-conducting compound 30. Such a targeted potting of the space 28 of the upper side 20 and the housing cover 26 with a heat-conducting compound 30 allows the upper side 20 of the battery modules 10 to be connected to the housing cover 26, in a targeted manner. As a result, the heat can be dissipated particularly efficiently from the battery cells 14 in that it is transferred to the housing cover 26.

Figure 4:
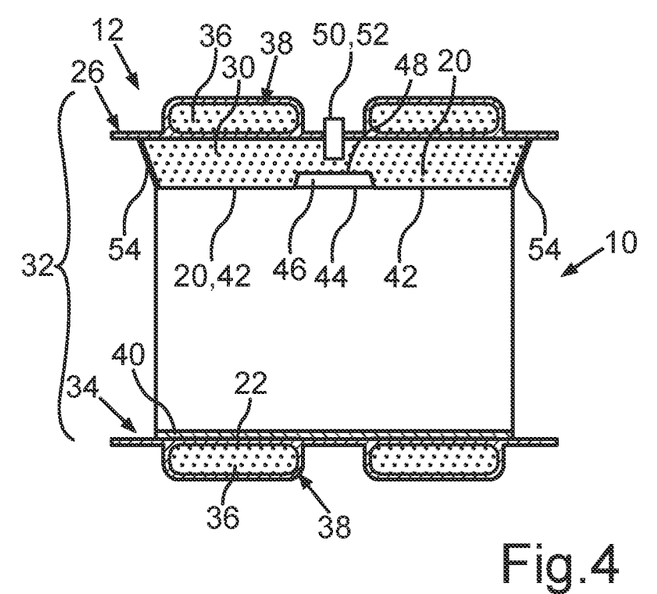
FIG. 4 shows a schematic side view of a battery arrangement having a battery module arranged in a battery housing according to an exemplary embodiment of the invention.
Figure 5:
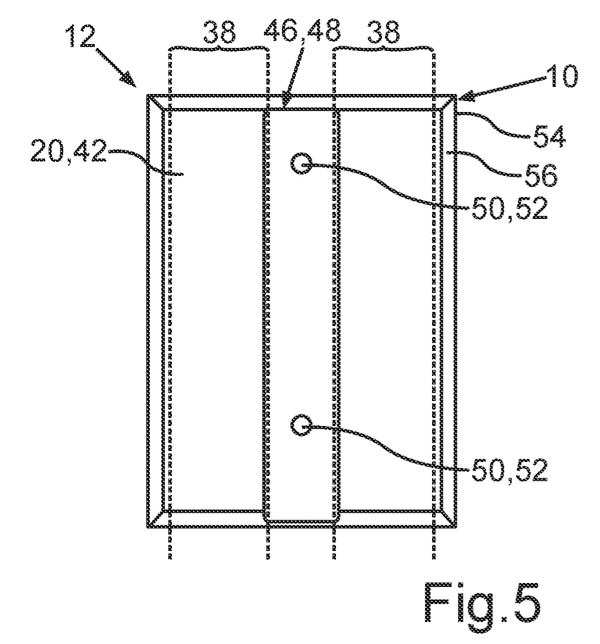
FIG. 5 shows a schematic top view of the battery arrangement shown in FIG. 4 according to an exemplary embodiment of the invention.

FIG. 4 shows a schematic side view of such a battery module arrangement 12 according to an exemplary embodiment of the invention, and FIG. 5 shows a schematic top view of this battery module arrangement 12. The battery module 10 of this battery module arrangement 12 can in particular be designed as described for FIG. 1 to FIG. 3. In addition, the battery housing 32 is now also shown in FIG. 4, which comprises a lower part 34 and the housing cover 26. As can be seen, the housing cover 26 is designed as a cooling cover in this example and has cooling channels 38 through which a cooling medium 36 can flow. Similarly, the lower part 34 can also be designed as a cooling device having such cooling channels 38 through which the cooling medium 36 or another cooling medium can flow. Furthermore, the lower part 34 can also be connected to the lower side 22 of the relevant battery modules 10 via a second heat-conducting compound 40. This second heat-conducting compound 40 for connecting the lower part 34 can represent the same heat-conducting compound 30 as is used to connect the upper side 20 to the housing cover 26 or a different one. In addition, in order to electrically insulate the battery module 10 from this heat-conducting compound 30, which is arranged between the upper side 20 and the housing cover 26, an insulation layer 42 is also provided, which covers the cell pole connections 16 as well as the interconnections and other electrical and/or electronic components, which can be arranged on the upper side of the battery cells 14. Such an insulation layer 42 can be designed, for example, as an insulating tape or the like. This insulation layer 42 preferably extends over the entire upper sides 18 of the respective battery cells 14 except for a region 44 in which the degassing devices 24 of the battery cells 14 are arranged. A degassing region in the form of a degassing channel 46 is arranged overlapping this region 44. This degassing channel 46 is free of heat-conducting compound 30, so that it is still possible for the gases escaping from the battery cells 14 to escape from the degassing devices 24. In order to prevent heat-conducting compound 30 from entering this degassing channel 46 when the battery module arrangement 12 is provided, a cover 48 is provided, which can be designed, for example, as an insert, a PVC insert. Such a cover 48 is designed in such a way that it is at a distance from the respective degassing devices 24, so that these degassing devices 24 are not closed by this cover 48. This cover 48 is also made of an electrically insulating material so that it is not necessary, for example to cover this region 44 of the upper side 18 of the battery cells 14 with an insulation layer 42 as well.

In order to arrange this heat-conducting compound 30 in the space 28 between the upper side 20 of the battery module 10 and the housing cover 26, it is provided that this heat-conducting compound 30 is poured or injected in a liquid or viscous state through at least one filling opening 50 in the housing cover 26. This at least one filling opening 50 is shown schematically in FIG. 5, for example. In addition, at least one ventilation opening 52 is provided in the housing cover 26, from which air displaced during the filling process can escape from the space 28. Which of these two openings 50, 52 shown here is now used for filling and which is used as a ventilation opening is not relevant here. In particular, these two openings 50, 52 can be designed in the same way. These openings 50, 52, at least one filling opening 50, are preferably located above the degassing channel 46 or above the cover 48, since in this central position above the degassing channel 46, the most uniform possible distribution of the heat-conducting compound 30 during filling is possible. In order to prevent the heat-conducting compound 30 poured into the space 28 from flowing laterally out of this space 28, a sealing element in the form of a sealing lip 54 is advantageously provided. This extends around the upper side 20 of the battery module 10 in an edge region 56 which delimits the battery module 10 or its upper side 20 both in its length L (cf. FIG. 3) and in its width B in the x direction. This sealing lip 54 can be designed, for example, as a rubber lip or a silicone lip. It is also particularly advantageous if this sealing lip 54 is arranged on the upper side 20 in the edge region 56 on the battery module 10, as can be seen, for example, in FIG. 1. The housing cover can then simply be placed on the battery module 10 or on the lower part 34 and thus automatically closes tightly with this sealing lip 54. For the particularly advantageous implementation, circumferential lips 54 are attached to the modules 10, which are supported on the housing cover 26 in the assembled state. The sealing lip 54 can also be made flexible, so that it can be bent or deflected outward under a certain minimum pressure, that is to say oriented away from the module 10. This can advantageously be used to guide gases escaping from the battery cells 14 via the degassing channel 46 to a region of this sealing lip 54, which in this example is designated by 54a and in which the sealing lip 54 can be broken through by the particle flow in case of degassing. In order to enable degassing of the cells 14, the gas channel or degassing channel 46 is inserted in or above the module cover, i.e., for example above the upper side 18 of the battery cells 14, which prevents the heat-conducting compound 30 from getting in front of the degassing openings, that is to say the degassing devices 24 of the cells 14. This is guided to the edge of the sealing lip 54 and in case of degassing, the sealing lip 54 is broken through by the particle flow.

Figure 6:
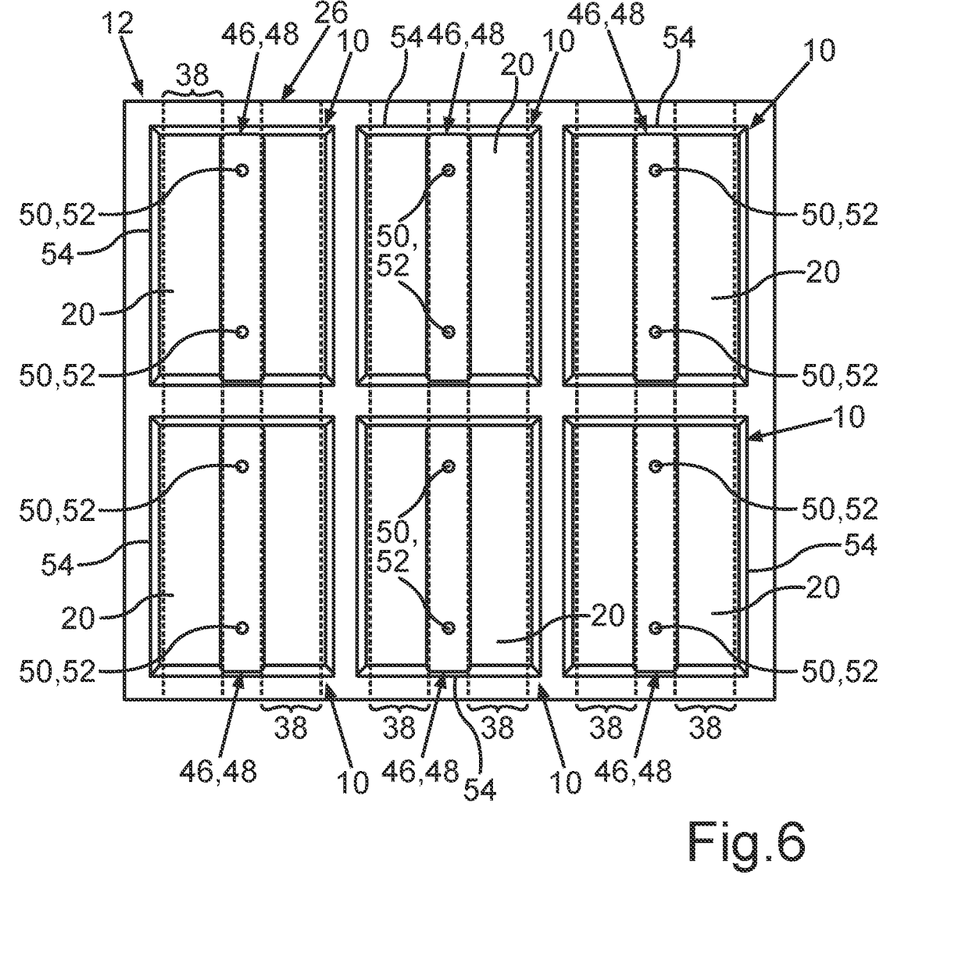
FIG. 6 shows a schematic top view of a battery arrangement having multiple battery modules according to an exemplary embodiment of the invention.

The battery arrangement 12 can also comprise multiple such battery modules 10, as is shown, for example, schematically in a top view in FIG. 6. The battery arrangement 12 can be designed, for example, as a high-voltage battery for an electric vehicle. These multiple battery modules 10 are arranged in a common battery housing 32 and are correspondingly covered by a housing cover 26. The cooling channels 38 of the housing cover 26 are shown by dashed lines and extend, for example, over the entire length of the housing cover 26 in the y direction and thus over multiple battery modules 10 at the same time. It can also be seen here that a filling opening 50 and a degassing or ventilation opening 52 are provided in the housing cover 26 for each battery module 10. The at least one filling opening 50 and ventilation openings 52 can be sealed either via the heat-conducting compound 30 or via a separate cover.

In the course of a method for providing such a battery arrangement, the module 10 can be installed with other modules 10 in a housing 32 and is thus thermally connected to the lower cooling plate 34. The housing cover 26 is then placed on the battery system. In addition to the cooling channels 38, this cover has at least one filling opening 50, using which it is possible to introduce the potting compound between housing cover 26 and module 10. A further opening 52 is used for ventilation. The at least one filling opening 50 and ventilation openings 52 are sealed either via the heat-conducting compound 30 or a separate cover.

Overall, the examples show how the invention can provide a connection for a cover cooling of a battery system, which enables a particularly efficient thermal connection of battery modules to the cover cooling provided by the battery cover.

The invention claimed is:

1. A battery arrangement comprising:
    a lower housing part and a housing cover arranged on the lower housing part;
    at least one battery module, which is arranged in the battery arrangement and has at least one battery cell;
    wherein the at least one battery module has a first side defining an upper side and is arranged in the battery arrangement in such a way that the upper side of the battery module faces toward the housing cover and is at a distance from the housing cover in at least one region of the upper side, between the upper side of the battery module and the housing cover, a heat-conducting compound completely fills a space between the at least one region of the upper side and the housing cover, and the battery arrangement has at least one sealing element which at least partially seals the space;
    a degassing region which is not filled with the heat-conducting compound, is spatially separated from the space, and adjoins respective degassing devices of the at least one battery cell, wherein each degassing device is located on an upper side of the respective battery cell between two cell pole connections.

2. The battery arrangement as claimed in claim 1, wherein the sealing element is arranged on an edge region surrounding the upper side of the battery module, which delimits the upper side of the battery module in its length (L) and width (B).

3. The battery arrangement as claimed in claim 1, wherein the degassing device of the battery cell is configured so that gas can be led out via the degassing region at least from the region between the upper side of the battery module and the housing cover, and break through the sealing element.

4. The battery arrangement as claimed in claim 3, wherein the degassing region is configured as a degassing channel which extends over an upper side of the battery module in a longitudinal direction (y) of the battery module up to a region of the sealing element.

5. The battery arrangement as claimed in claim 4, wherein the at least one battery module has multiple battery cells which are arranged adjacent to one another in the longitudinal extension direction (y), wherein the degassing channel is configured to overlap the respective degassing devices of the battery cells.

6. The battery arrangement as claimed in claim 1, wherein at least one closable or closed ventilation opening is arranged in the housing cover above the space in relation to a first direction (z) from the upper side to the housing cover.

7. The battery arrangement as claimed in claim 1, wherein the at least one battery cell has a first side on which cell pole connections of the at least one battery cell and a degassing device, are arranged, wherein the at least one battery cell is arranged in the battery arrangement in such a way that the first side of the at least one battery cell faces toward the housing cover.

8. The battery arrangement as claimed in claim 4, wherein the degassing channel is arranged extending over a first region of the first side of the at least one battery cell and the battery arrangement has at least one electrically insulating insulation layer which, in at least one second region of the first side of the battery cell different from the first region, is configured to overlap at least the cell pole connections, wherein the degassing device is arranged in relation to a second direction (y) between the two cell pole connections of the battery cell, wherein the first side of the battery cell is divided into two second regions and the central first region arranged between the two second regions, over which the degassing channel extends, wherein an electrically insulating insulation layer is arranged at least overlapping the respective cell pole connection in each case in one of the second regions.

9. The battery arrangement as claimed in claim 1, wherein the housing cover is configured as a cooling device and has cooling channels through which a coolant can flow.

10. The battery arrangement as claimed in claim 2, wherein the battery arrangement has a degassing region which is not filled with the heat-conducting compound and is spatially separated from the space, adjoins a degassing device of the at least one battery cell, and is configured so that a gas escaping from the degassing device of the battery cell can be led out via the degassing region at least from the region between the upper side of the battery module and the housing cover and through the sealing element.

11. The battery arrangement as claimed in claim 2, wherein at least one closable or closed ventilation opening is arranged in the housing cover above the space in relation to a first direction (z) from the upper side to the housing cover.

12. The battery arrangement as claimed in claim 3, wherein at least one closable or closed ventilation opening is arranged in the housing cover above the space in relation to a first direction (z) from the upper side to the housing cover.

13. The battery arrangement as claimed in claim 4, wherein at least one closable or closed ventilation opening is arranged in the housing cover above the space in relation to a first direction (z) from the upper side to the housing cover.

14. The battery arrangement as claimed in claim 5, wherein at least one closable or closed ventilation opening, is arranged in the housing cover above the space in relation to a first direction (z) from the upper side to the housing cover.

15. The battery arrangement as claimed in claim 2, wherein the at least one battery cell has a first side on which cell pole connections of the at least one battery cell; and the degassing device are arranged, and the at least one battery cell is arranged in the battery arrangement in such a way that the first side of the at least one battery cell faces toward the housing cover.

16. The battery arrangement as claimed in claim 3, wherein the at least one battery cell has a first side on which cell pole connections of the at least one battery cell; and the degassing device, are arranged, and the at least one battery cell is arranged in the battery arrangement in such a way that the first side of the at least one battery cell faces toward the housing cover.

17. The battery arrangement as claimed in claim 4, wherein the at least one battery cell has a first side on which cell pole connections of the at least one battery cell and the degassing device, are arranged, and the at least one battery cell is arranged in the battery arrangement in such a way that the first side of the at least one battery cell faces toward the housing cover.

18. The battery arrangement as claimed in claim 5, wherein the at least one battery cell has a first side on which cell pole connections of the at least one battery cell; and the degassing device, are arranged, and the at least one battery cell is arranged in the battery arrangement in such a way that the first side of the at least one battery cell faces toward the housing cover.

19. The battery arrangement as claimed in claim 6, wherein the at least one battery cell has a first side on which cell pole connections of the at least one battery cell and the degassing device, are arranged, and the at least one battery cell is arranged in the battery arrangement in such a way that the first side of the at least one battery cell faces toward the housing cover.

* * * * *